United States Patent
Allen et al.

(10) Patent No.: US 9,326,494 B2
(45) Date of Patent: May 3, 2016

(54) FISH TANK

(71) Applicant: Elive LLC, New Berlin, WI (US)

(72) Inventors: Matthew Allen, Waterford, WI (US); Thomas Lutz, Cedar Rapids, IA (US)

(73) Assignee: ELIVE LLC, Muskego, WI (US)

( * ) Notice: Subject to any disclaimer, the term of this patent is extended or adjusted under 35 U.S.C. 154(b) by 185 days.

(21) Appl. No.: 14/053,288

(22) Filed: Oct. 14, 2013

(65) Prior Publication Data
US 2015/0101540 A1 Apr. 16, 2015

(51) Int. Cl.
- *A01K 63/06* (2006.01)
- *A01K 63/00* (2006.01)
- *A01G 9/02* (2006.01)

(52) U.S. Cl.
CPC ............ *A01K 63/06* (2013.01); *A01K 63/003* (2013.01); *A01G 9/02* (2013.01)

(58) Field of Classification Search
CPC ... A01K 63/00; A01K 63/003; A01K 63/006; A01K 63/06
USPC ............ 119/245–48, 253, 267, 269; 47/66.1, 47/66.5, 86, 39, 79, 82
IPC ........................................ A01K 63/00, 63/06
See application file for complete search history.

(56) References Cited

U.S. PATENT DOCUMENTS

| | | |
|---|---|---|
| D90,646 S | 9/1933 | Carnes |
| D90,647 S | 9/1933 | Carnes |
| D136,064 S | 7/1943 | Fordyce |
| 3,576,426 A | 4/1971 | Sesholtz |
| D231,008 S | 3/1974 | Hullender |
| 4,020,337 A * | 4/1977 | Chatten ................... F21S 4/003 362/234 |
| D291,426 S | 8/1987 | Husbands |
| D299,565 S | 1/1989 | Hsu |
| 5,040,489 A * | 8/1991 | Drake ........................... 119/246 |
| D324,590 S * | 3/1992 | Pixler .......................... D30/102 |
| 5,282,438 A * | 2/1994 | McLaughlin ................. 119/248 |
| 5,775,260 A * | 7/1998 | Jansen ......................... 119/246 |
| 5,906,176 A * | 5/1999 | Pei ............................... 119/247 |
| 5,957,084 A | 9/1999 | Knepp |
| 6,029,936 A * | 2/2000 | Senese .......................... 248/146 |
| 6,447,137 B1 * | 9/2002 | Long .................... B05B 17/085 239/17 |

(Continued)

OTHER PUBLICATIONS

"EcoQube—Desktop Ecosystem That Grows Flowers and Herbs", by Aqua Design Innovations, https://www.kickstarter.com/projects/kevinzl/ecoqube-desktop-ecosystem-that-grow-flowers-and-he, Dec. 30, 2013 (25 pages).

*Primary Examiner* — Lisa Tsang

(74) *Attorney, Agent, or Firm* — Michael Best & Friedrich LLP

(57) ABSTRACT

An apparatus includes a housing having a first surface having a first contour and arranged to contain a quantity of water. The apparatus further includes a base structure positioned adjacent the housing and including a second surface having a second contour that closely matches the first contour. The housing is positioned such that the first surface and the second surface are disposed immediately adjacent one another. The apparatus further includes a lighting element supported by the base and positioned to selectively illuminate the housing. The apparatus further includes a storage compartment having an open cavity for receiving and holding an object and a third surface having a third contour that closely matches the first contour, the storage compartment supported by the base structure such that the first surface and the third surface are disposed immediately adjacent one another.

9 Claims, 14 Drawing Sheets

(56) References Cited

U.S. PATENT DOCUMENTS

| | | | |
|---|---|---|---|
| 7,243,613 B2 * | 7/2007 | Holms et al. | 119/248 |
| 7,341,022 B2 * | 3/2008 | Ming | A01K 63/003 119/245 |
| 8,113,147 B1 * | 2/2012 | Wang | 119/267 |
| 9,089,115 B2 * | 7/2015 | Lari | A01K 63/006 |
| 2008/0316732 A1 * | 12/2008 | Blake | 362/101 |
| 2015/0000607 A1 * | 1/2015 | Reid et al. | 119/248 |

* cited by examiner

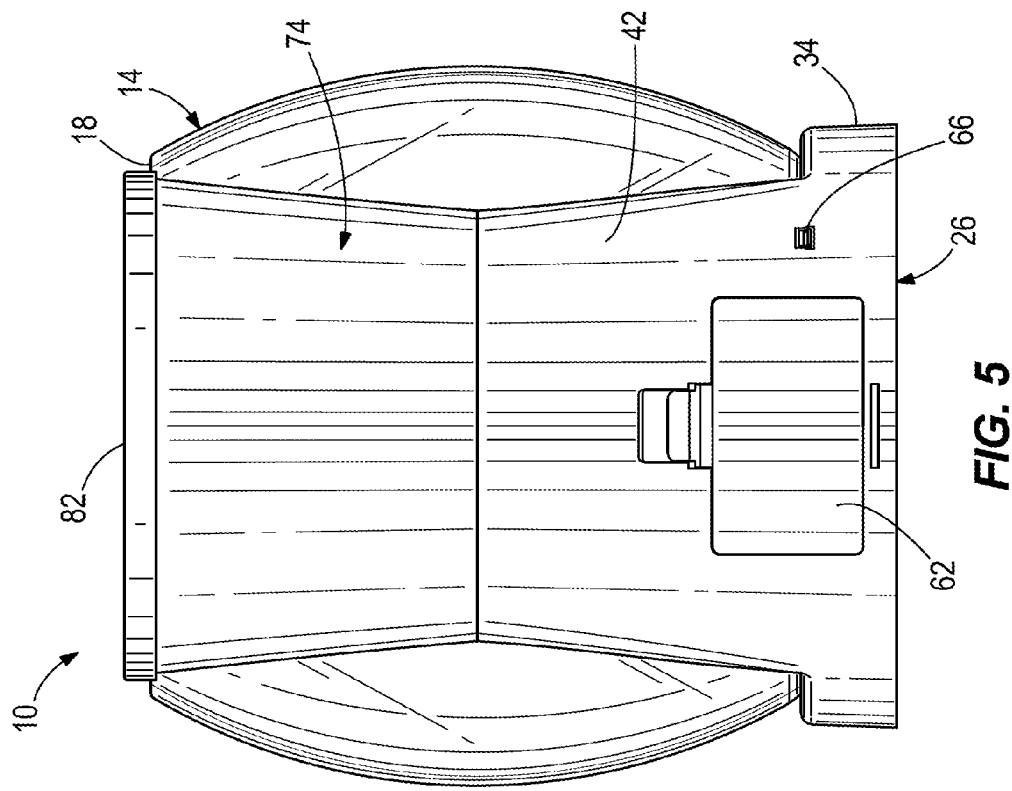
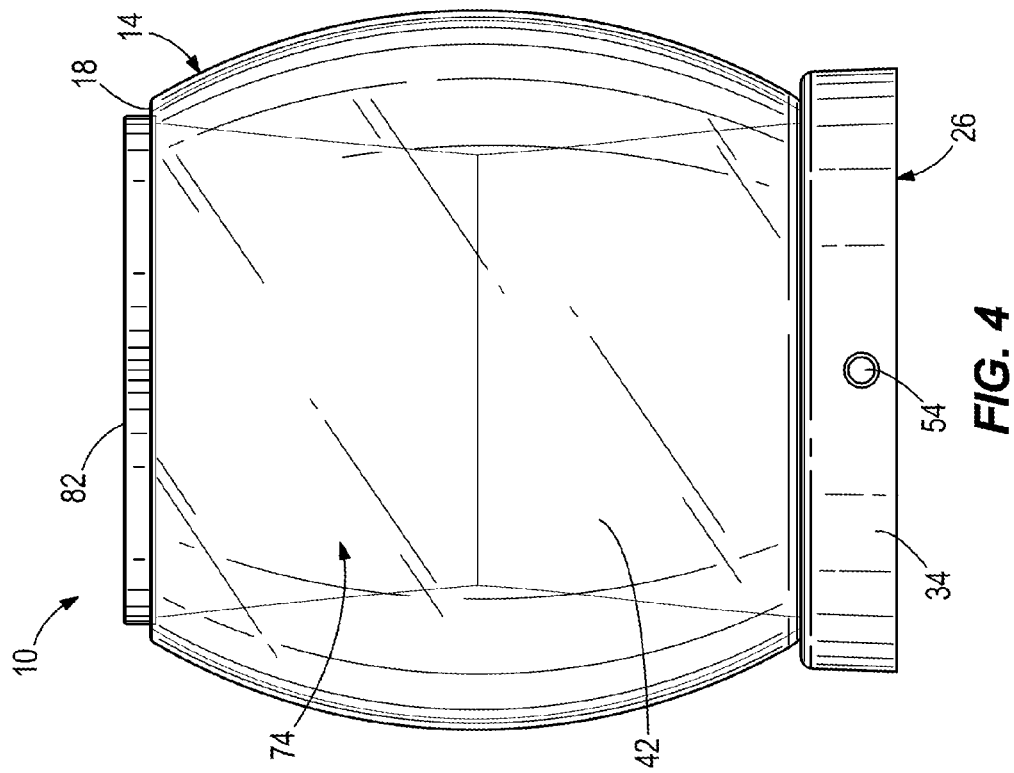

FISH TANK

BACKGROUND

The present invention relates to fish tanks, and in particular to fish tanks used in home and office settings.

Fish tanks are commonly found in home and office settings, and typically include a small transparent bowl filled with water that houses one or more fish. The fish tanks are placed on a desk, or on a counter or cabinet, so that people inside the home or office are able to view and observe the fish inside the bowl. The fish tanks also commonly include an opening at the top of the bowl so that food may be added into the bowl, and so that water may be removed and added as needed.

SUMMARY

In one construction, the invention provides an apparatus that includes a housing having a first surface having a first contour and arranged to contain a quantity of water. The apparatus further includes a base structure positioned adjacent the housing and including a second surface having a second contour that closely matches the first contour. The housing is positioned such that the first surface and the second surface are disposed immediately adjacent one another. The apparatus further includes a lighting element supported by the base and positioned to selectively illuminate the housing. The apparatus further includes a storage compartment having an open cavity for receiving and holding an object and a third surface having a third contour that closely matches the first contour, the storage compartment supported by the base structure such that the first surface and the third surface are disposed immediately adjacent one another.

In another construction, the invention provides an apparatus that includes a housing having a bottom surface and a first surface having a first contour and arranged to contain a quantity of water. The apparatus further includes a base structure including a vertically extending portion and a lower portion having a recessed area, the recessed area formed to receive the bottom surface of the housing, the vertically extending portion defining a cavity. The apparatus further includes a lighting element positioned within the lower portion to selectively illuminate the housing through the bottom surface. The apparatus further includes a drainage compartment supported by the vertically extending portion and at least partially disposed within the cavity. The apparatus further includes a storage compartment having an open cavity for receiving and holding an object, the storage compartment supported by the base structure immediately above the drainage compartment.

In another construction, the invention provides an apparatus that includes a first housing having a first surface having a first contour and arranged to contain a quantity of water. The apparatus further includes a second housing having a second surface having a second contour and arranged to contain a quantity of water. The apparatus further includes a base structure positioned between the first housing and the second housing and including a third surface having a third contour and a fourth surface having a fourth contour, the first contour closely matching the third contour. The first housing is positioned such that the first surface and the third surface are disposed immediately adjacent one another, and the second contour closely matching the fourth contour. The second housing is positioned such that the second surface and the fourth surface are disposed immediately adjacent one another. The apparatus further includes a storage compartment formed as part of the base structure and having an open cavity for receiving and holding an object. The apparatus further includes a cavity formed as part of the base structure immediately below the storage compartment, and a removable drainage drawer selectively positioned within the cavity.

Other aspects of the invention will become apparent by consideration of the detailed description and accompanying drawings.

BRIEF DESCRIPTION OF THE DRAWINGS

FIG. 4 is a front elevational view of the fish tank of FIG. 1.
FIG. 5 is a back elevational view of the fish tank of FIG. 1.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it should be understood that the phraseology and terminology used herein are for the purpose of description and should not be regarded as limiting.

FIGS. 1-8 illustrate a fish tank 10 according to one construction of the invention. The fish tank 10 includes a housing 14 for holding gravel, water, and fish. The housing 14 is at least partially transparent, and is in the shape of a bowl having a rim 18 defining an opening 22 at a top portion of the housing 14. Other constructions of the fish tank 10 include different shapes and sizes for the housing 14 other than that illustrated.

Figure 8:
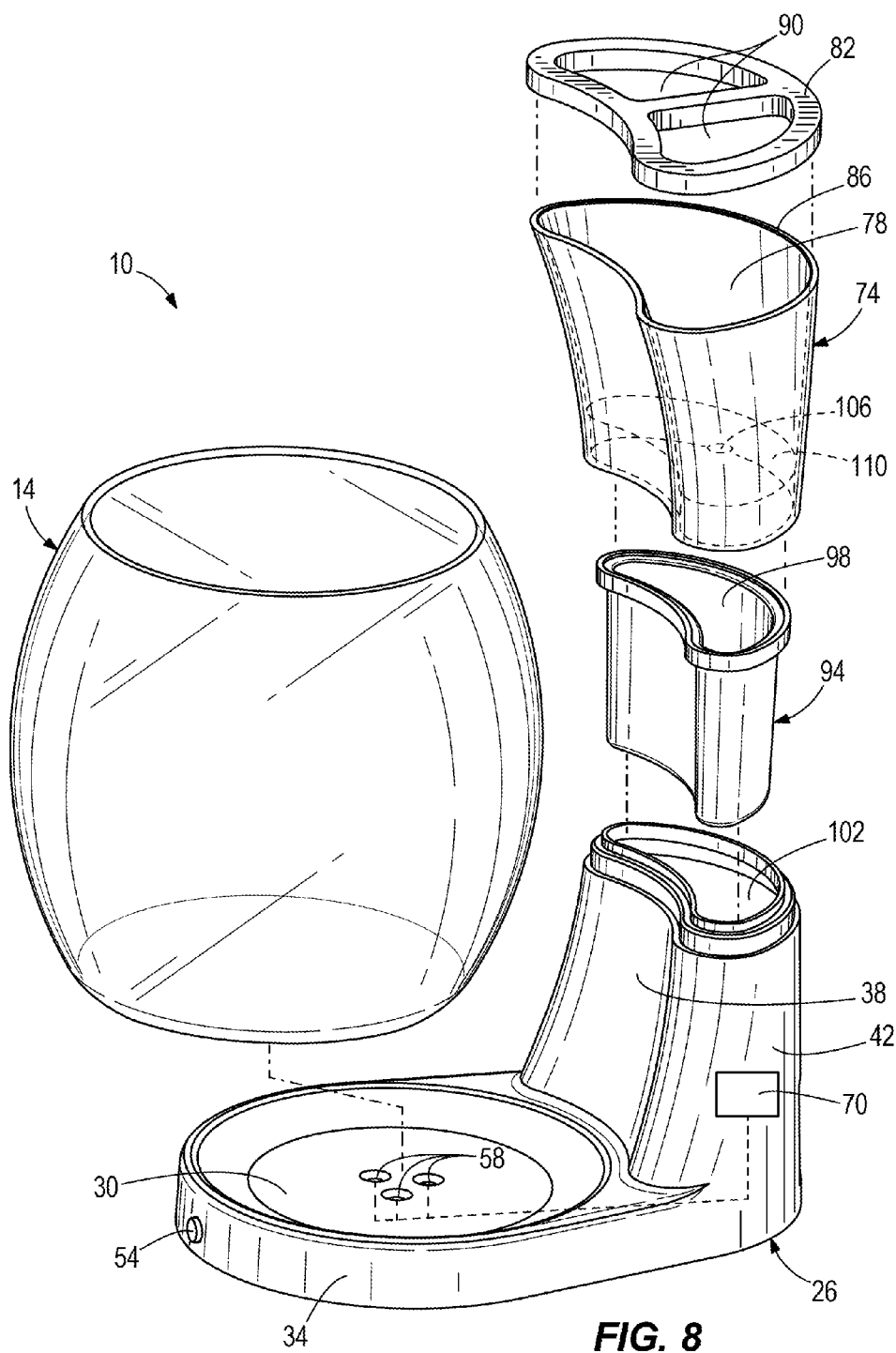
FIG. 8 is an exploded perspective view of the fish tank of FIG. 1.

The fish tank 10 includes a base structure 26 that supports the housing 14. As illustrated in FIG. 8, the base structure 26 includes a first recessed area 30 disposed along a lower portion 34 of the base structure 26. The first recessed area 30 receives at least a portion of the housing 14 and inhibits the housing 14 from tipping out of the base structure 26.

The base structure 26 also includes a second recessed area 38 disposed along a back, generally vertically extending portion 42 of the base structure 26. The second recessed area 38 has a curved surface disposed adjacent an outer surface of the housing 14, with a contour that approximately matches the contour of the outer surface of the housing 14.

Figure 7:
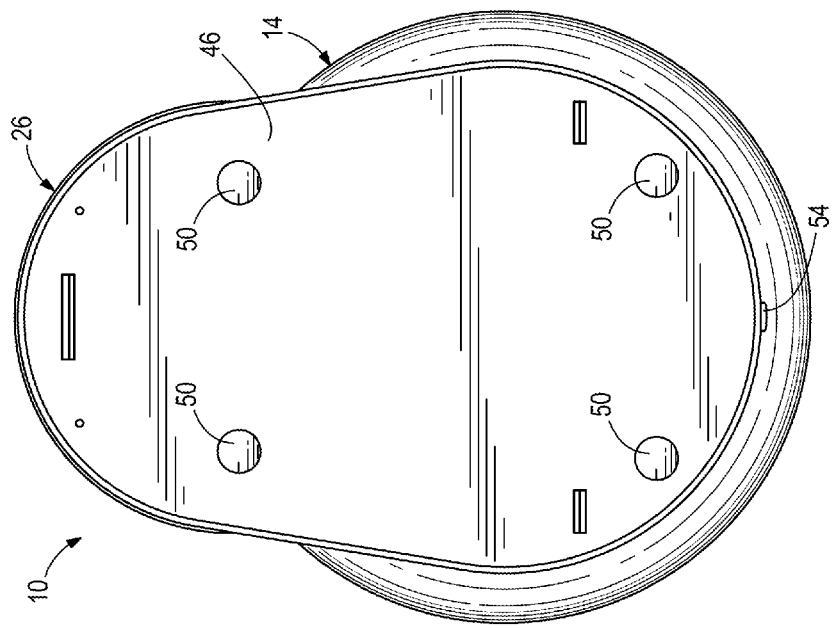
FIG. 7 is a bottom plan view of the fish tank of FIG. 1.
Figure 6:
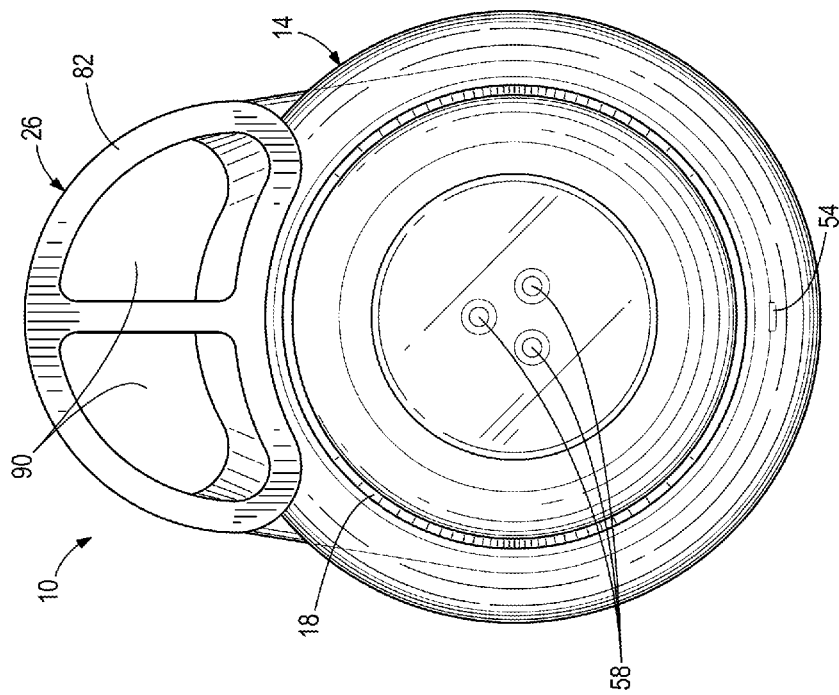
FIG. 6 is a top plan view of the fish tank of FIG. 1.

With reference to FIG. 7, the base structure 26 also includes a generally flat bottom surface 46 and four friction elements 50 along the bottom surface 46, although other constructions include different numbers of friction elements 50. The friction elements 50 are pads that grip the surface of a desk, shelf, cabinet, etc., and inhibit the base structure 26 from moving or sliding. In some constructions the entire flat bottom surface 46 itself is made of a pad or padding material that functions as a friction element.

With reference to FIGS. 1-4 and 6-8, the base structure 26 also includes a switch element 54 and at least one lighting element 58 (FIGS. 1, 6, and 8) that illuminates the inside of the housing 14. The switch element 54 is positioned along a front of the fish tank 10, and is used to turn the lighting elements 58 on and off. Other constructions include different locations for the switch element 54, including along a side of the base structure 26, or along a back of the base structure 26. In some constructions the switch 54 is also used to create a low, medium, and high intensity light setting. For example, by pressing the switch 54 a first time, a low intensity light setting is generated. By pressing the switch 54 a second time, a medium intensity light setting is generated, the medium intensity light setting being brighter than the low intensity light setting. By pressing the switch 54 a third time, a high intensity light setting is generated, the high intensity light setting being brighter than the medium intensity light setting. In some constructions different colored lighting elements 58 are used to give a different color effect or effects in the housing 14.

The lighting elements 58 are LED's, though in other constructions different types of lighting elements 58 are used. Three lighting elements 58 are located in a generally central area of the first recessed area 30, directing light up into the housing 14 from beneath the housing 14 to illuminate the inside of the housing 14. In other constructions different numbers and locations for the lighting elements 58 are used, including locations that direct light into the side of the housing 14 or direct light from above down into the housing 14.

Figure 1:
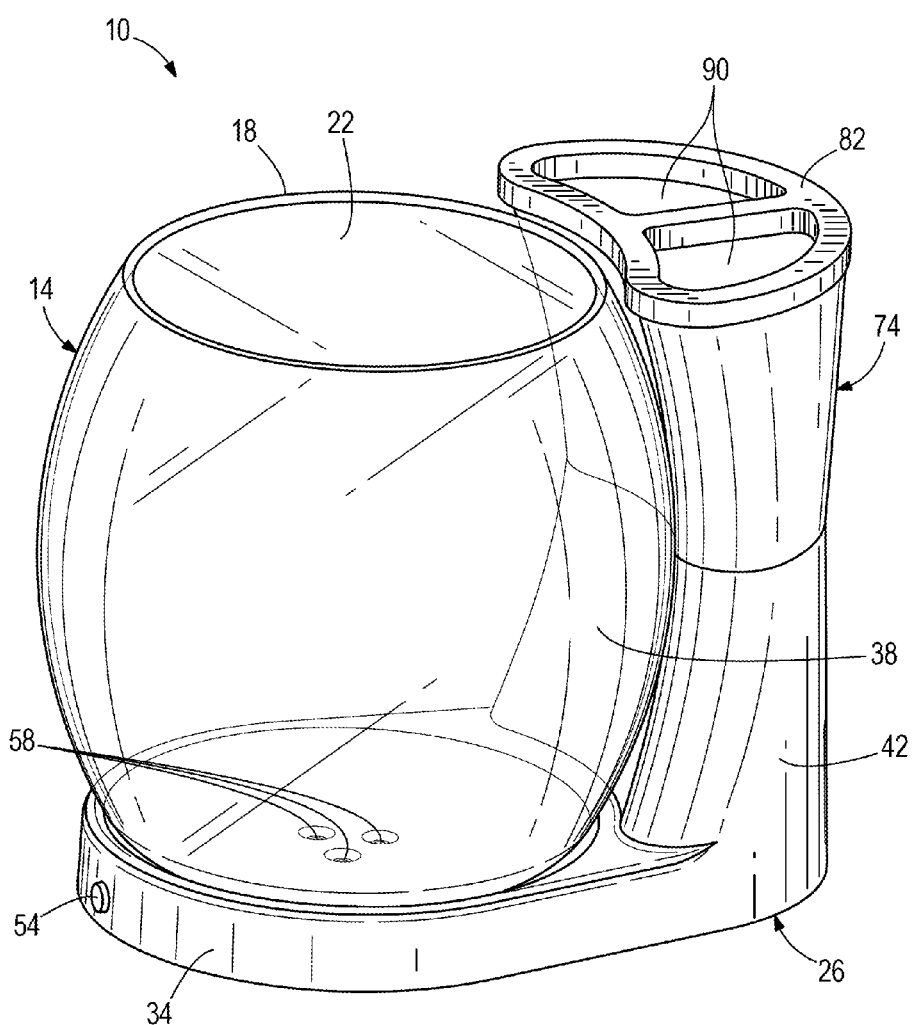
FIG. 1 is a perspective view of a fish tank according to one construction of the invention.
Figure 2:
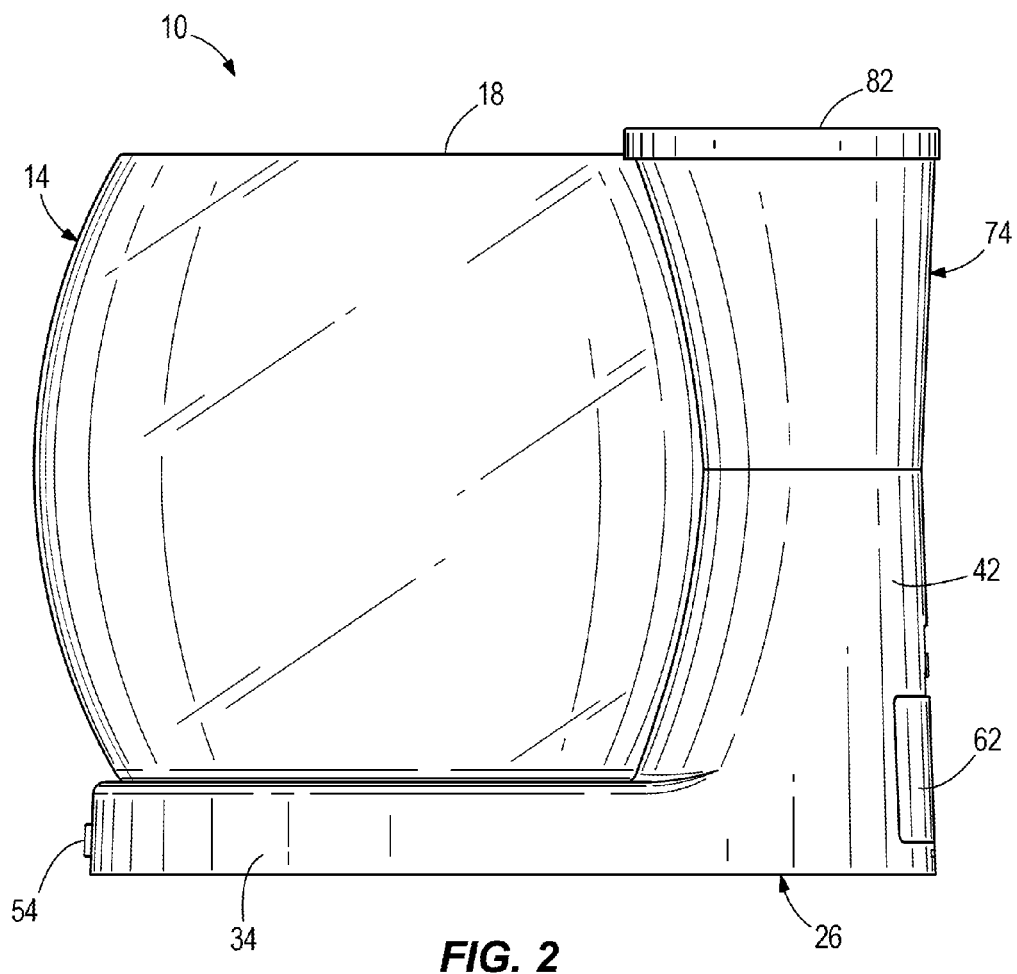
FIG. 2 is a left side view of the fish tank of FIG. 1.
Figure 3:
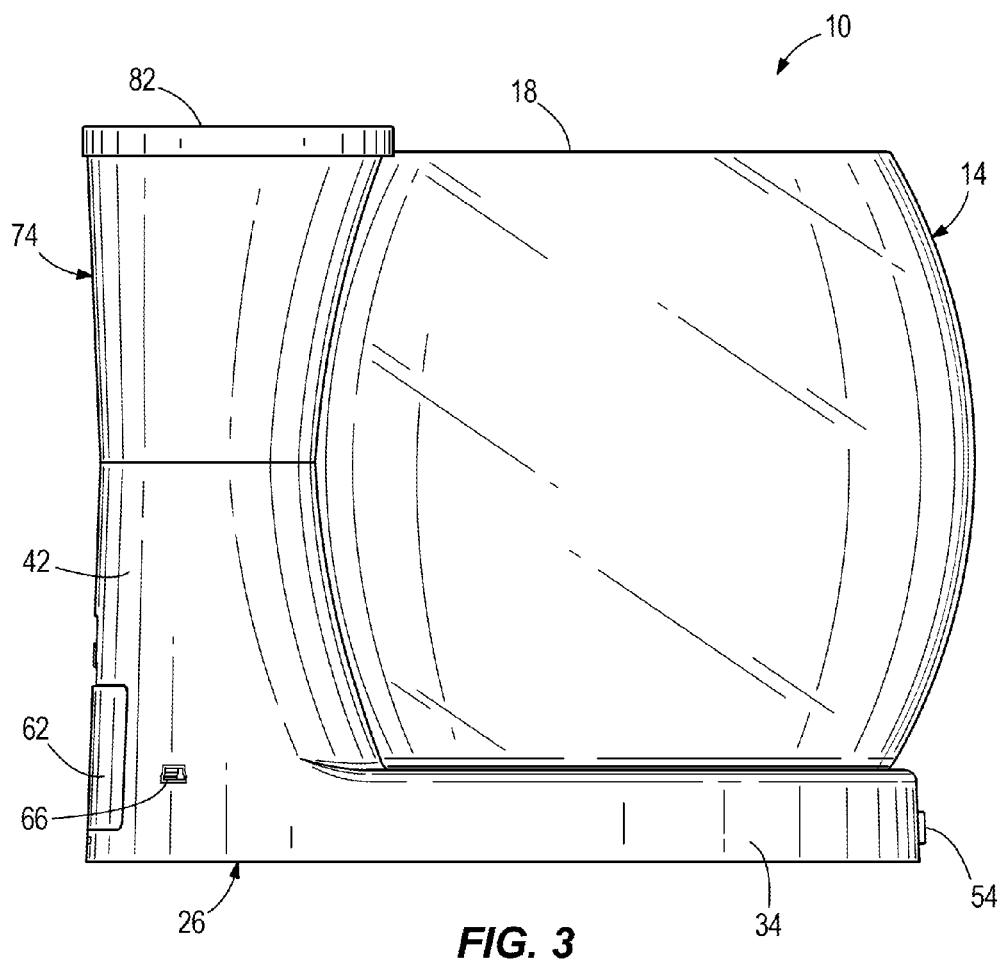
FIG. 3 is a right side view of the fish tank of FIG. 1.

With reference to FIGS. 2, 3, and 5, the base structure 26 includes a battery compartment cover 62. Each of the lighting elements 58 is powered by a battery or batteries (not shown) located behind the battery compartment cover 62 and within a battery compartment of the base structure 26. With reference to FIGS. 3 and 5, the base structure 26 also includes a power port 66 (e.g., USB, DC plug, etc.), for powering the lighting elements 58 with outside electrical power.

The lighting elements 58 can include a timer, so that they are not left on for extensive periods of time. In particular, if a user actuates the switch element 54 to turn on the lighting elements 58, the lighting elements 58 will stay on for approximately four hours if left uninterrupted before they will automatically shut off. Other constructions include different timing periods other than four hours. An electrical control unit 70, illustrated schematically in FIG. 8, communicates with the lighting elements 58 to control the timing of the lighting elements 58. The electronic control unit 70 may be disposed, for example, in the lower portion 34 or elsewhere within the fish tank 10.

With reference to FIG. 8, the fish tank 10 further includes a storage compartment 74 that is supported by and is removable from the base structure 26. The storage compartment 74 includes an open cavity 78 for receiving and holding one or more objects, including but not limited to soil, plants, office supplies (e.g., pens, pencils), or other items a user may wish to store in the fish tank 10. The storage compartment 74 is disposed generally behind the housing 14, and includes a removable divider portion 82. The divider portion 82 couples to an edge 86 of the storage compartment 74, and includes a plurality of openings 90 for insertion of the one or more items described above. The divider portion 82 may be used, for example, as an organizer for organizing various office supplies.

With continued reference to FIG. 8, the fish tank 10 also includes a drainage compartment 94 that is supported by and is removable from the base structure 26. The drainage compartment 94 is disposed adjacent to and below the storage compartment 74, and includes an open cavity 98 for holding water. The drainage compartment 94 is disposed within a cavity 102 inside the base structure 26.

With continued reference to FIG. 8, the storage compartment 74 is in communication with the drainage compartment 94. The storage compartment 74 includes an opening 106 along a bottom wall 110 of the storage compartment 74. In the event that soil and plants are placed into the storage compartment 74, the small opening 106 allows excess water applied to the plants and soil to drain through the bottom of the storage compartment 74 and into the open cavity 98 beneath the storage compartment 74. While only a single small opening 106 is illustrated, in other constructions the storage compartment 74 includes a plurality of openings 106. When the drainage compartment 94 becomes full with water, a user first removes the storage compartment 74 from the base structure 26, and then removes the drainage compartment 94 to dump the water out before reinserting the drainage compartment 94 and then the storage compartment 74.

FIGS. 9-16 illustrate another fish tank 210. The fish tank 210 includes two separate housings 214 for holding gravel, water, and fish. The housings 214 are both at least partially transparent, and are in the shape of cylinders having rims 218 defining openings 222 at top portions of the housings 214. Other constructions of the fish tank 210 include different shapes and sizes for the housings 214 other than those illustrated.

The fish tank 210 includes a base structure 226 that supports the housings 214. The base structure 226 separates the housings 214, although in some constructions the housings 214 are in direct contact with one another. As illustrated in FIGS. 9-12 and 15, the base structure 226 includes a first, vertically extending recessed area 230 disposed along a front portion of the base structure 226 that receives a portion of one of the two housings 214. The base structure 226 also includes a second, vertically extending recessed area 238 disposed along the front portion of the base structure that receives a portion of the second of the two housings 214. The recessed areas 230, 238 each have a curved surface disposed adjacent an outer surface of one of the housings 214, with a contour that approximately matches the contour of the outer surface of the housing 214.

Figure 15:
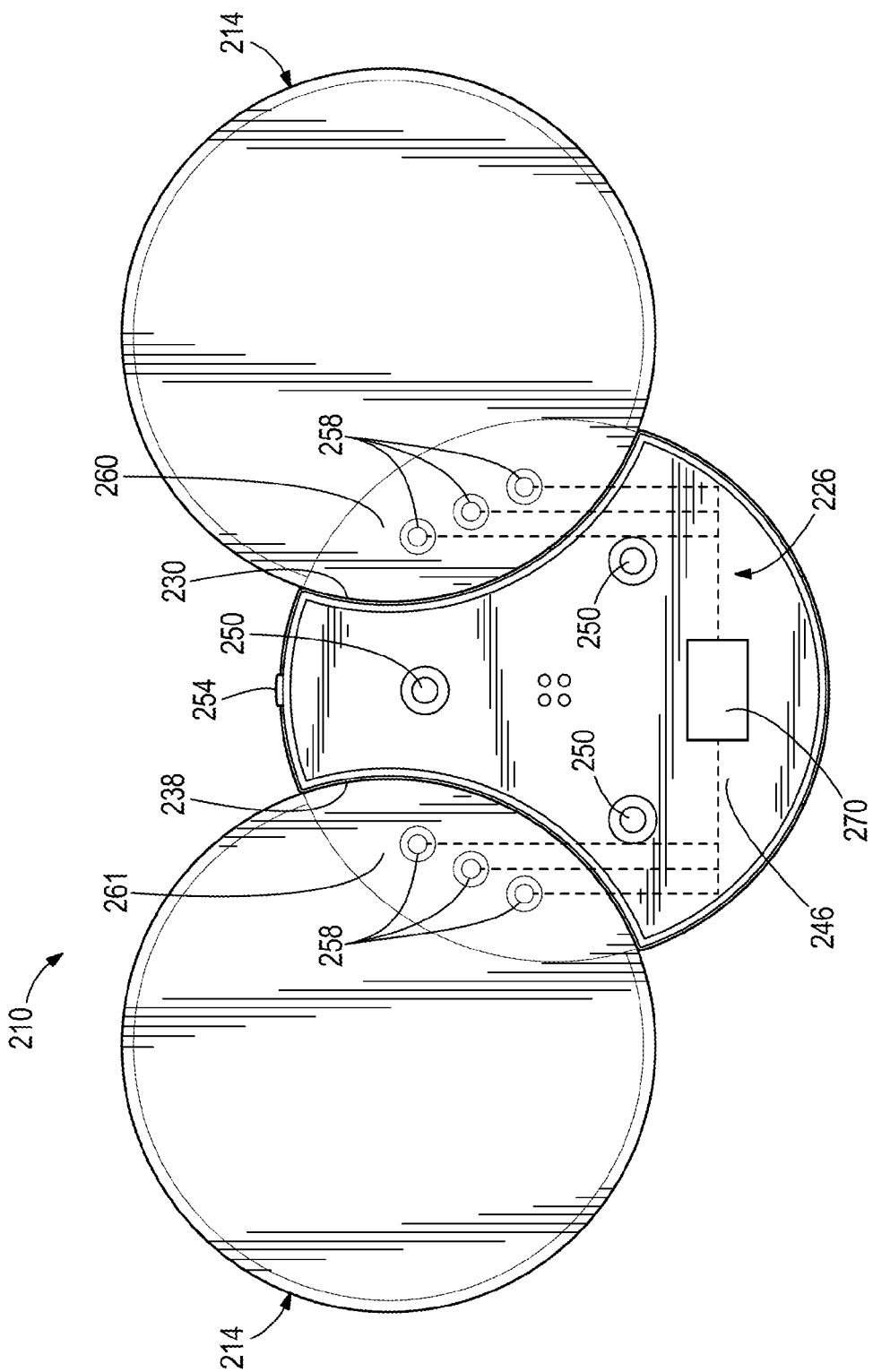
FIG. 15 is a bottom plan view of the fish tank of FIG. 10.

With reference to FIG. 15, the base structure 226 includes a generally flat bottom surface 246 and three friction elements 250 disposed along the bottom surface 246, although other constructions include different numbers of friction elements 250. The friction elements 250 are pads that grip the surface of a desk, shelf, cabinet, etc., and inhibit the base structure 226 from moving or sliding. In some constructions the flat bottom surface 246 itself is made of a pad or padding material that functions as a friction element.

With reference to FIGS. 9-12, 14, and 15, the base structure 226 also includes a switch element 254 and at least one lighting element 258 (FIG. 15) that illuminates the water and/or other contents within the housing 214. The switch element 254 is positioned along a front of the base structure 226, and is used to turn the lighting elements 258 on and off. Other constructions include different locations for the switch element 254, including along a side of the base structure 226, or along a back of the base structure 226.

The lighting elements 258 are LED's, though in other constructions different types of lighting elements 258 are used. Three lighting elements 58 are disposed along the bottom of a first overhang portion 260 at the top of the base structure 226, and three other lighting elements 258 are disposed along the bottom of a second overhang portion 261 at the top of the base structure 226, the overhang portions 260, 261 being disposed adjacent the first and second recessed areas 230, 238 respectively. The lighting elements 258 direct light down into the housings 214 to illuminate the insides of the housings 214. In some constructions, when the switch 254 is pushed a first time, less than all of the lighting element 258 are activated (e.g., only one or two out of three lighting elements 258 are activated on each overhang portion 260, 261 respectively). When the switch 254 is activated a second time, the remaining lighting elements 258 on the overhangs 260, 261 are activated, such that all of the lighting elements 258 are activated. When the switch 254 is activated a third time, all of the lighting elements 258 are turned off. In other constructions different lighting patterns and sequences are used, as are different numbers and locations for the lighting elements 258, including locations that direct light into the sides of the housings 214 or up from below the housings 214. In some constructions different colored lighting elements 258 are used to give a different color effect or effects in the housings 214.

Figure 10:
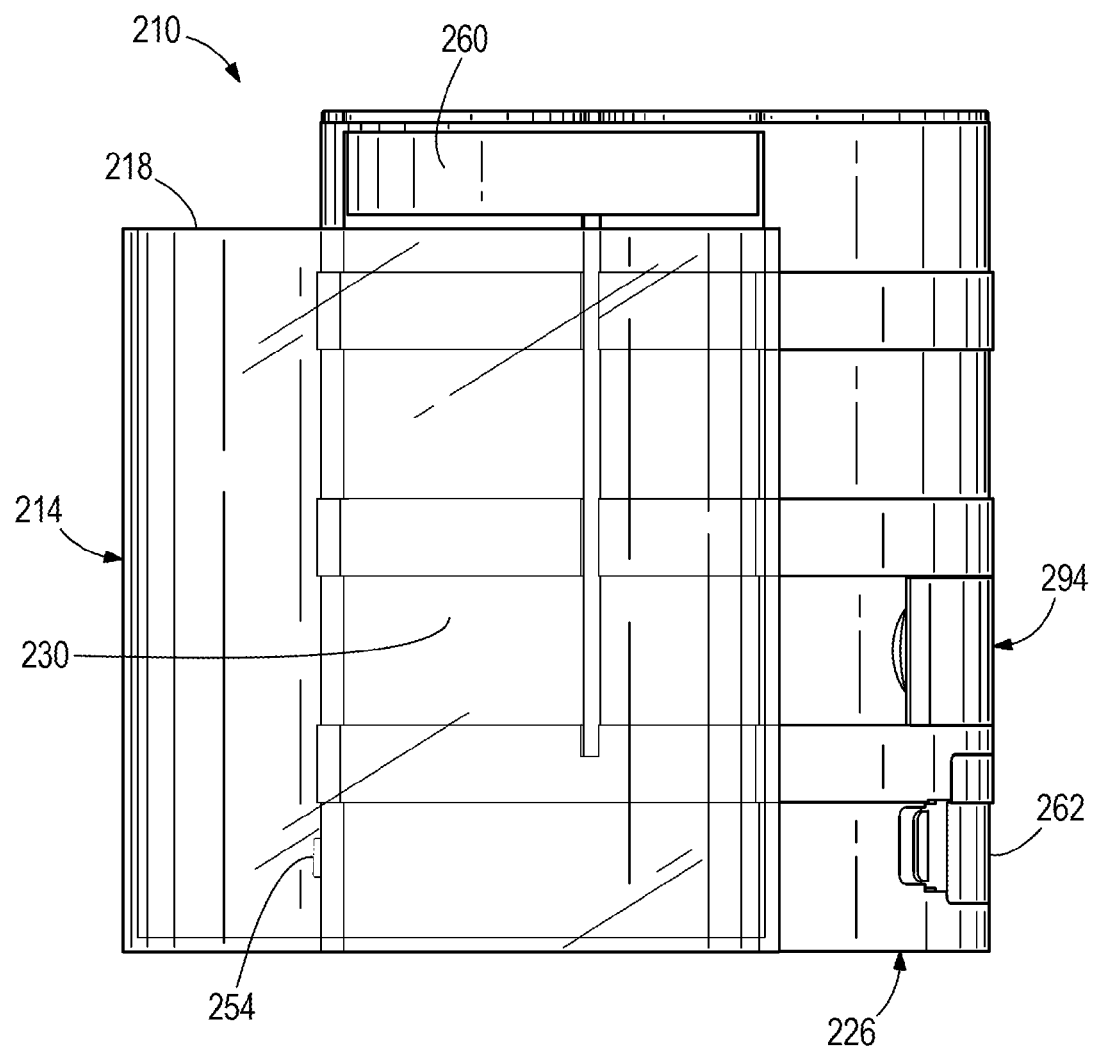
FIG. 10 is a left side view of the fish tank of FIG. 10.
Figure 11:
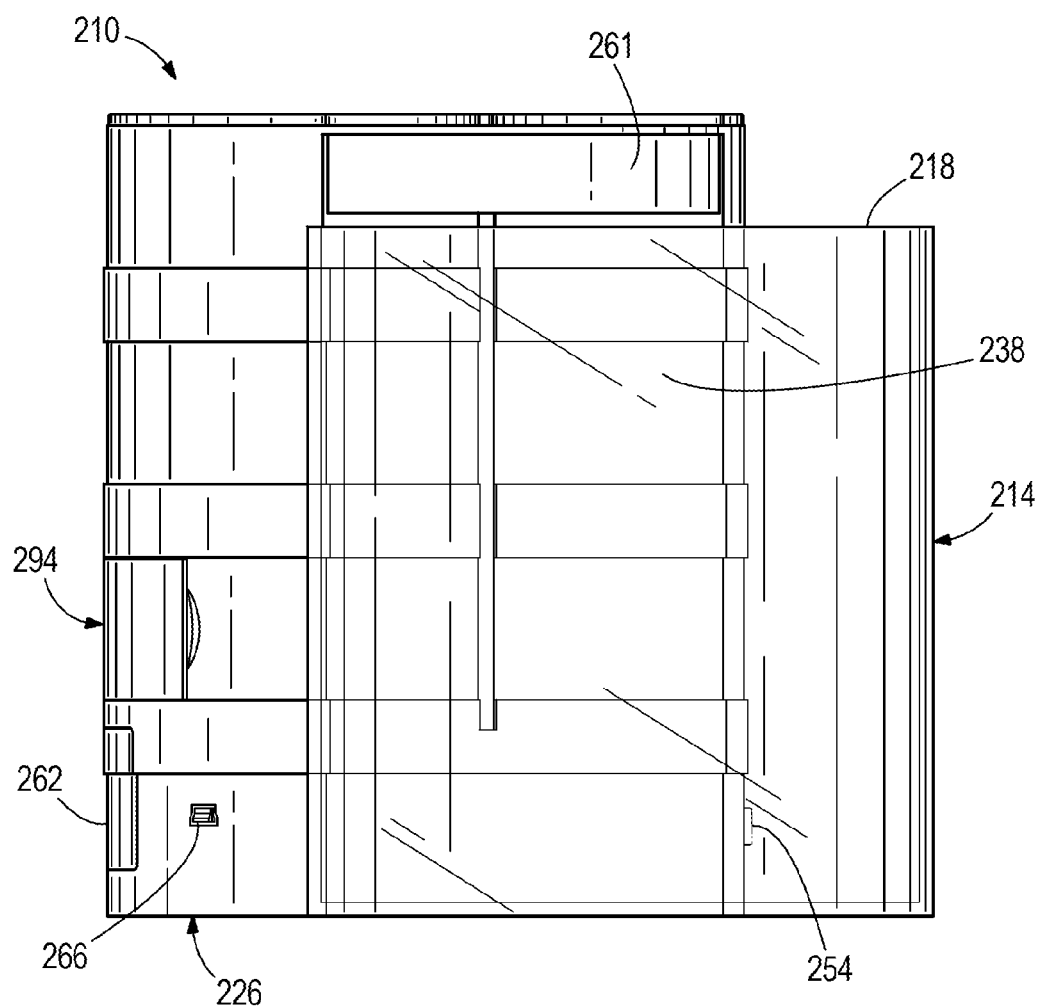
FIG. 11 is a right side view of the fish tank of FIG. 10.
Figure 12:
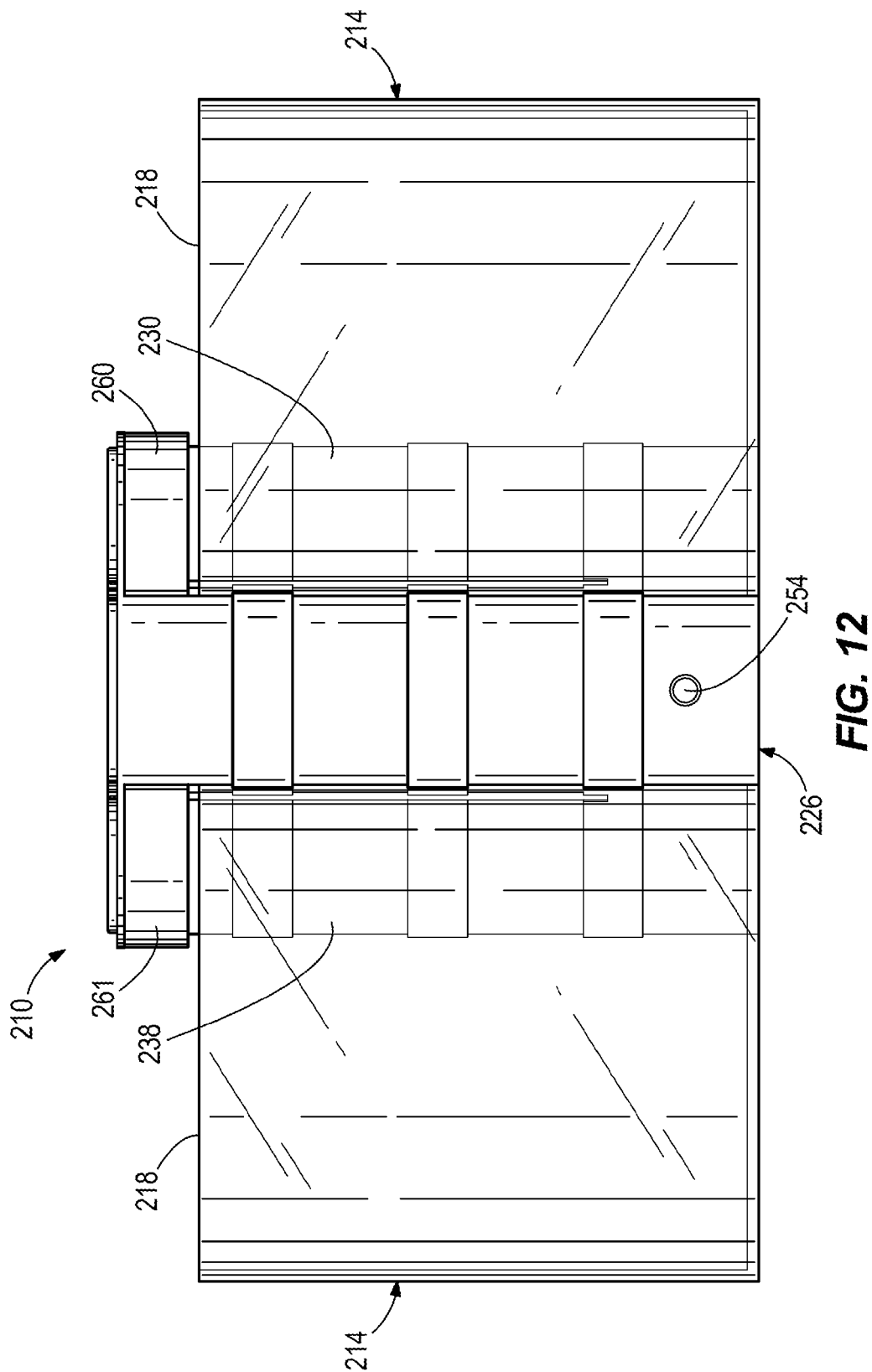
FIG. 12 is a front elevational view of the fish tank of FIG. 10.
Figure 13:
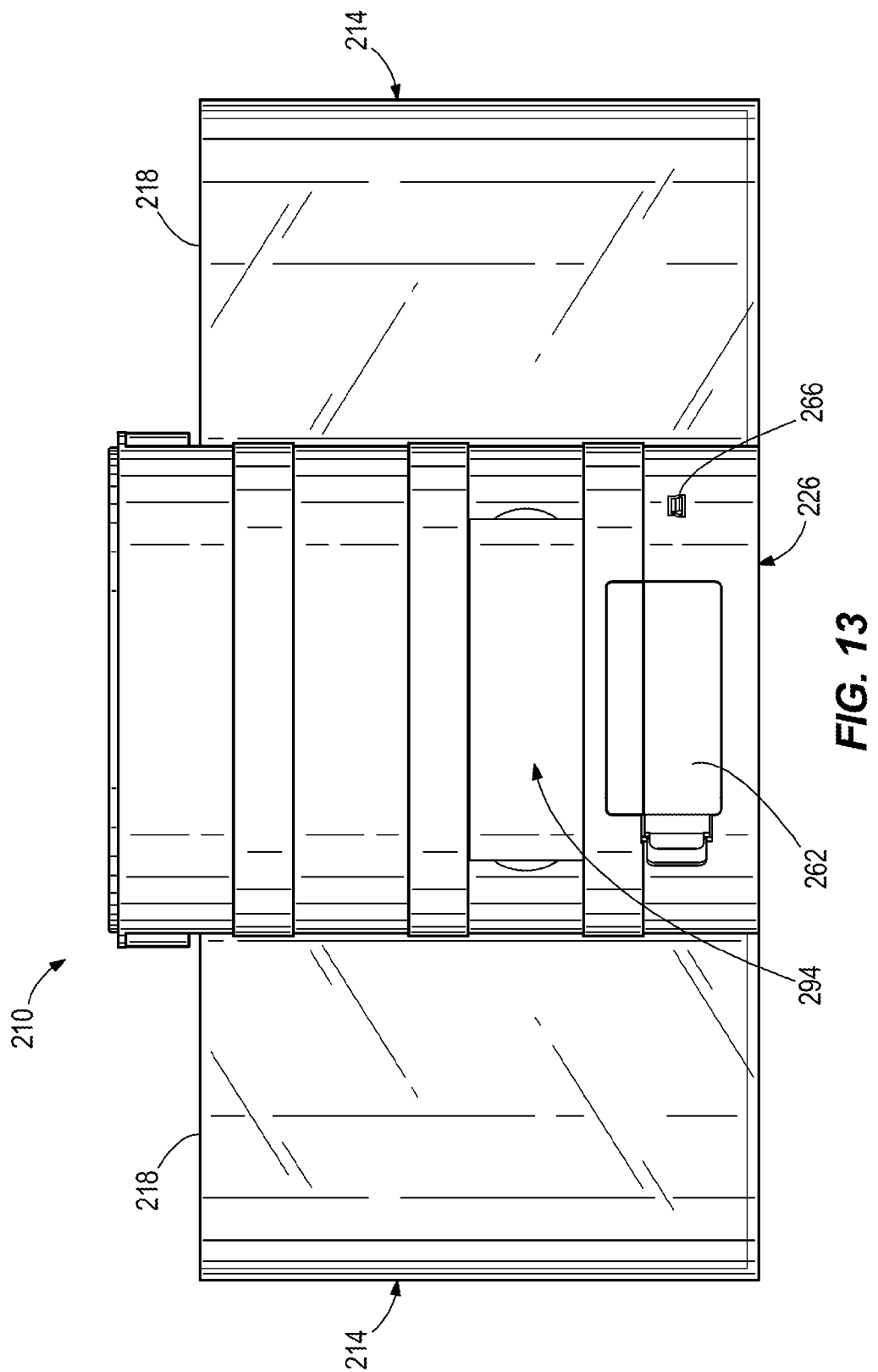
FIG. 13 is a back elevational view of the fish tank of FIG. 10.

With reference to FIGS. 10, 11, and 13, the base structure 226 also includes a battery compartment cover 262. Each of the lighting elements 258 is powered by a battery or batteries (not shown) located behind the battery compartment cover 262 and within a battery compartment of the base structure 226. The base structure 226 also includes a power port 266 (e.g., USB, DC plug, etc.), for powering the lighting elements 258 with outside electrical power.

The lighting elements 258 can also include a timer, so that they are not left on for extensive periods of time. In particular, if a user actuates the switch element 254 to turn on the lighting elements 258, the lighting elements 258 will stay on for approximately four hours if left uninterrupted before they will automatically shut off. Other constructions include different timing periods other than four hours. An electrical control unit 270, illustrated schematically in FIG. 15, communicates with the lighting elements 258 to control the timing of the lighting elements 258, as well as the lighting patterns discussed above. The electronic control unit 270 may be disposed, for example, inside the base structure 226.

Figure 9:
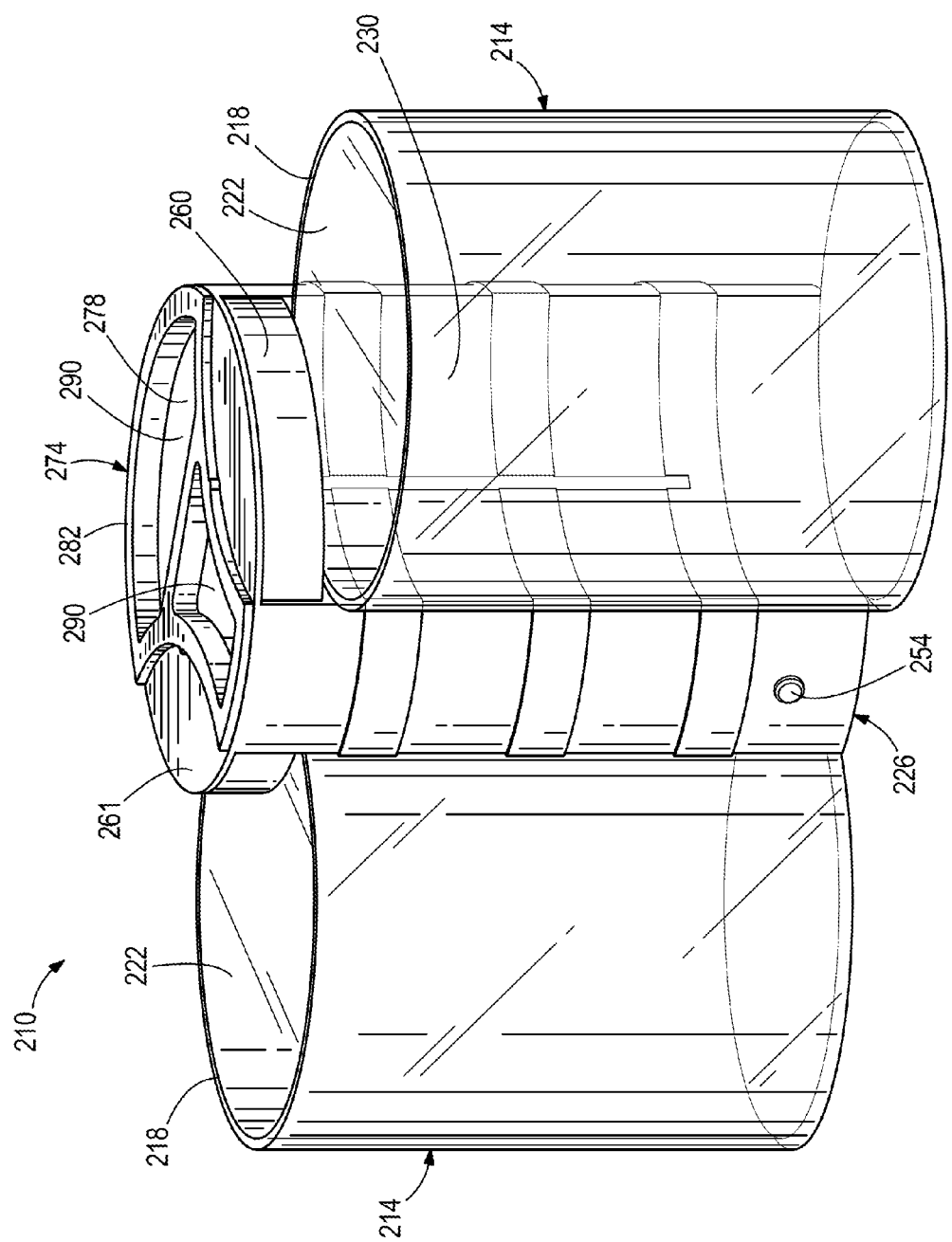
FIG. 9 is a perspective view of a fish tank according to another construction of the invention.
Figure 14:
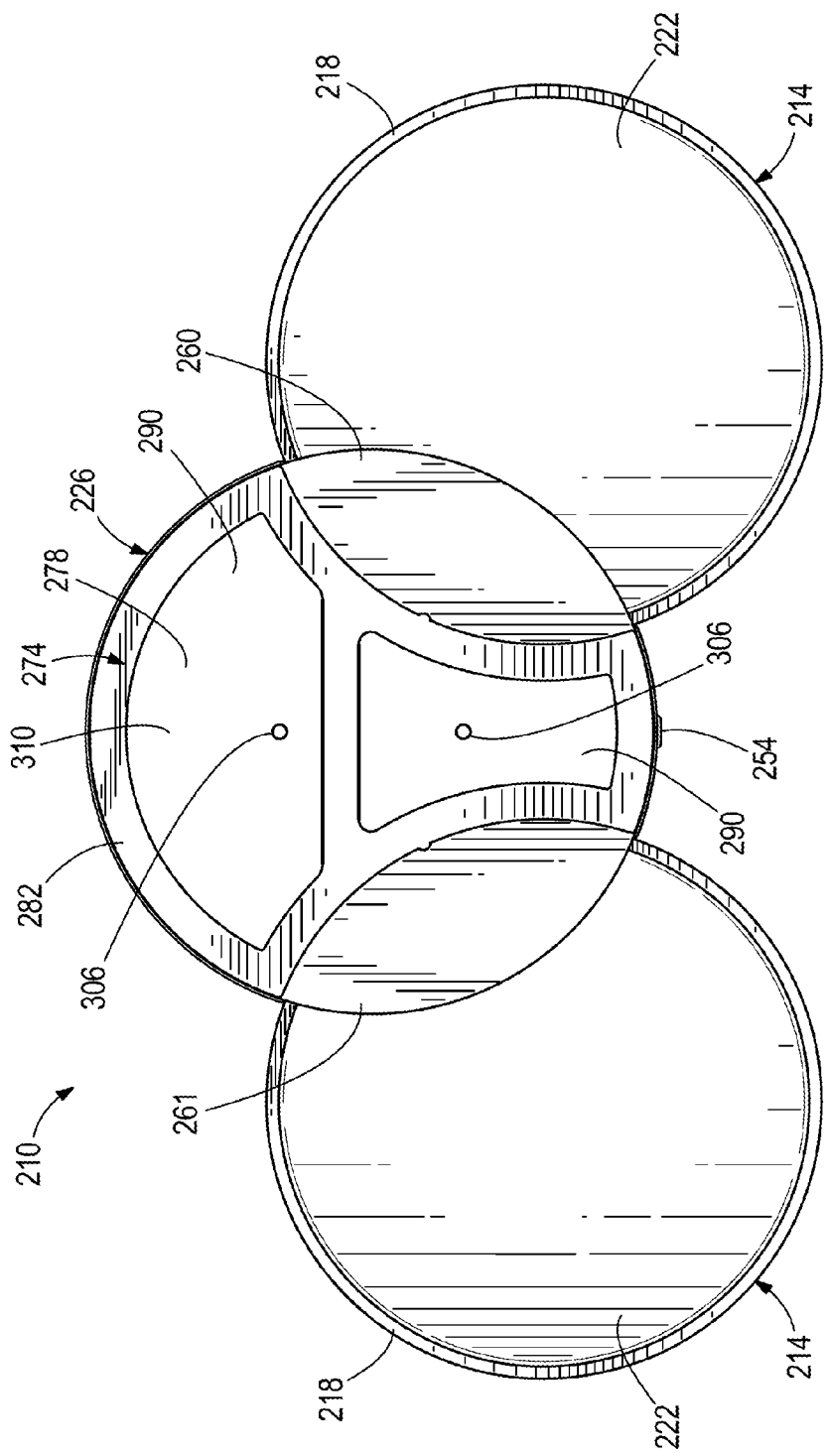
FIG. 14 is a top plan view of the fish tank of FIG. 10.
Figure 16:
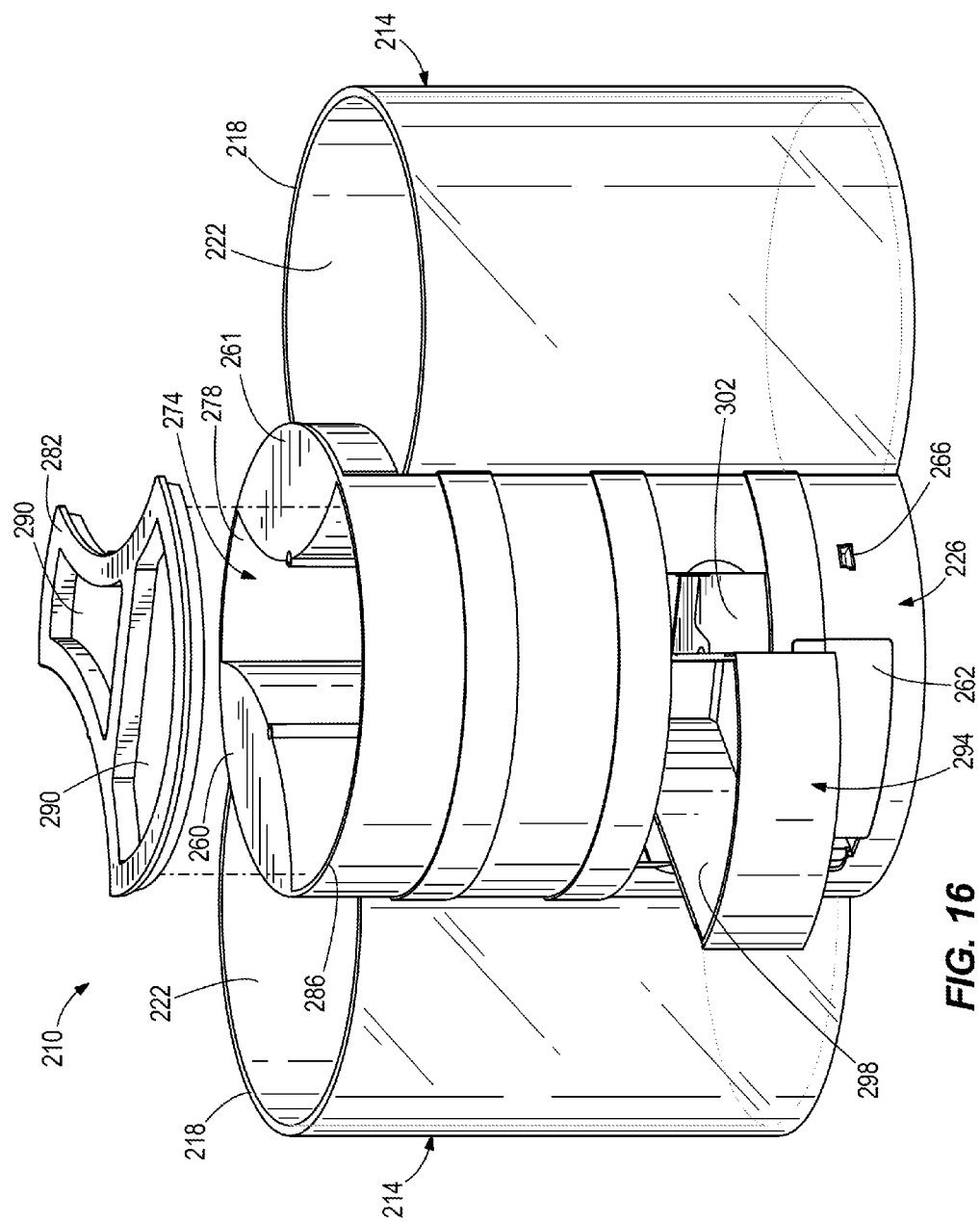
FIG. 16 is a partially exploded perspective view of the fish tank of FIG. 10.

With reference to FIGS. 9, 14, and 16, the base structure 226 further includes a storage compartment 274 disposed within the base structure 26. The storage compartment 274 includes an open cavity 278 for receiving and holding one or more objects, including but not limited to soil, plants, office supplies (e.g., pens, pencils), or other items a user may wish to store in the fish tank 210. The storage compartment 274 is disposed generally behind the housings 214, and includes a removable divider portion 282. The divider portion 282 couples to an edge 286 (FIG. 16) of the storage compartment 274, and includes a plurality of openings 290 for insertion of the one or more items described above. The divider portion 282 may be used, for example, as an organizer for organizing various office supplies.

With reference to FIGS. 10, 11, 13 and 16, the fish tank 210 also includes a drainage compartment 294 that is supported by and is removable from the base structure 226 by pulling the drainage compartment out laterally from the base structure 226 (FIG. 16). The drainage compartment 294 is disposed adjacent to and below the storage compartment 274, and as illustrated in FIG. 16 includes an open cavity 298 for receiving water. The drainage compartment 294 is disposed within a cavity 302 inside the base structure 226.

With reference to FIG. 14, the storage compartment 274 is in communication with the drainage compartment 294. The storage compartment 274 includes two small openings 306 disposed along a bottom wall 310 of the storage compartment 274. While only two small openings 306 are illustrated, in other constructions the storage compartment 274 includes a plurality of openings 306. In the event that soil and plants are placed into the storage compartment 274, the small openings 306 allow excess water applied to the plants and soil to drain through the bottom of the storage compartment 274 and into the removable drainage compartment 294. When the drainage compartment 294 becomes full with water, a user simply removes the drainage compartment 294 to dump the water, and then reinserts the drainage compartment 294 back into the base structure 226.

Although the invention has been described in detail with reference to certain preferred constructions, variations and modifications exist within the scope and spirit of one or more independent aspects of the invention as described.

The invention claimed is:

1. An apparatus comprising:
   a housing having a bottom surface and a first surface having a first contour and arranged to contain a quantity of water;
   a base structure including a vertically extending portion and a lower portion having a recessed area, the recessed area formed to receive the bottom surface of the housing, the vertically extending portion defining a cavity;
   a lighting element positioned within the lower portion to selectively illuminate the housing through the bottom surface;
   a drainage compartment supported by the vertically extending portion and at least partially disposed within the cavity; and
   a storage compartment having an open cavity for receiving and holding an object, the storage compartment supported by the base structure immediately above the drainage compartment, wherein the housing is fluidly isolated from both the drainage compartment and the storage compartment.

2. The apparatus of claim 1, wherein the storage compartment is removable from the base structure.

3. The apparatus of claim 1, wherein the storage compartment includes an opening along a bottom of the storage compartment that permits water to drain from the storage compartment into the drainage compartment.

4. The apparatus of claim 1, wherein the drainage compartment is removable from the base structure only by first removing the storage compartment.

5. The apparatus of claim 1, wherein the housing is a bowl having a rim and an opening on top of the bowl.

6. The apparatus of claim 1, wherein the base structure further includes a battery compartment and a power port.

7. The apparatus of claim 1, wherein the storage compartment includes a divider removably coupled to an edge of the storage compartment.

8. The apparatus of claim 1, wherein the lighting element includes a plurality of LEDs (light-emitting diodes).

9. The apparatus of claim 1, wherein the housing has a bottom surface and the first surface extends upwardly from the bottom surface, wherein the first surface defines an opening at a top of the housing opposite the bottom surface, and wherein the quantity of water is accessible via the opening.

* * * * *